United States Patent [19]

Byrd

[11] 4,200,609
[45] Apr. 29, 1980

[54] OZONE REMOVAL FILTER CONTAINING MANGANESE DIOXIDE AND CERIC OXIDE CATALYSTS

[75] Inventor: Norman R. Byrd, Villa Park, Calif.

[73] Assignee: McDonnell Douglas Corporation, Long Beach, Calif.

[21] Appl. No.: 892,975

[22] Filed: Apr. 3, 1978

[51] Int. Cl.$^2$ .................. B01J 23/34; B01J 23/84; C01B 13/08

[52] U.S. Cl. .................... 422/122; 252/471; 422/177; 422/181; 422/218; 422/222; 423/210; 423/219

[58] Field of Search .............. 21/53, 74 R, 74 A; 23/288 R, 288 F, 288 FA, 288 FB, 288 FC; 252/471; 423/210 C, 219; 422/4, 122, 177, 181, 218, 222

[56] References Cited

U.S. PATENT DOCUMENTS

| | | | |
|---|---|---|---|
| 2,739,132 | 3/1956 | Riedl | 252/471 |
| 3,019,197 | 1/1962 | Saunders | 252/471 |
| 3,269,801 | 8/1966 | Boberg et al. | 23/288 F |
| 3,295,918 | 1/1967 | Briggs et al. | 252/471 |
| 3,407,532 | 9/1975 | Roberts | 252/471 |
| 3,993,597 | 11/1976 | Stiles | 252/471 |
| 4,003,854 | 1/1977 | Skviorttov et al. | 252/471 |
| 4,007,118 | 2/1977 | Ciambrone | 23/288 R |
| 4,111,793 | 9/1978 | Kolombos et al. | 252/471 |

FOREIGN PATENT DOCUMENTS

| | | | |
|---|---|---|---|
| 50-36387 | 4/1975 | Japan | 252/471 |
| 51-54083 | 5/1976 | Japan | 252/471 |

OTHER PUBLICATIONS

"The Merck Index", 9th Ed., 1976, pp. 71, 250, 993.
Rideal; "Ozone", Sep. 5, 1922, p. 135, Constable & Co. Ltd.

*Primary Examiner*—Joseph Scovronek
*Assistant Examiner*—Bradley Garris
*Attorney, Agent, or Firm*—Max Geldin

[57] ABSTRACT

Production of a device or filter for removal of ozone from air, e.g. in aircraft cabins, by depositing an oxide film containing manganese dioxide on a substrate, particularly a light weight thermally stable substrate, e.g. polybenzimidazole, by treatment with a permanganate solution containing a soluble ceric salt such as ceric ammonium nitrate, and preferably also a dichromate such as sodium dichromate, to form a dense strongly adherent film or coating of $MnO_2$, ceric oxide and preferably also chromic oxide, on the substrate. A solution containing an oxidizable organic component such as abietic acid can be first applied to the substrate, followed by treatment with the above permanganate solution.

20 Claims, 10 Drawing Figures

FIG_10

FIG_9

OZONE REMOVAL FILTER CONTAINING MANGANESE DIOXIDE AND CERIC OXIDE CATALYSTS

BACKGROUND OF THE INVENTION

This invention relates to the removal of ozone from air by decomposition thereof to oxygen, and is particularly concerned with procedure for the production of an efficient device or filter for the above purpose, and with the device or filter thus obtained.

Current commercial aircraft fly at altitudes where there is ozone present in the atmosphere. Recent interest in ozone removal from aircraft cabins has resulted due to an apparent increase in ozone being injected into the passenger compartment when planes fly at altitudes as low as 23,000 feet to normal cruise altitudes of 35,000 to 39,000 feet. The ozone laden air is introduced into the aircraft cabin through the air conditioning and pressurization supply ducting. The ozone concentrations thus introduced are sufficiently high to cause some discomfort to the passengers.

To overcome this problem, recent investigations have been undertaken. Certain of these investigations have involved the use of carbon and pelletized catalyst filters to remove the ozone under the above conditions.

Among the various ways known to eliminate ozone contamination from an ambience by decomposition of the ozone into oxygen are catalytic substances including metallic and non-metallic catalysts. Although catalytic systems appear to be the most efficient way to remove ozone from the bleed air or pneumatic ducting air supply system of an aircraft, many of such catalytic substances e.g. in the form of pellets or particles, must be carried in a container or canister, which creates problems with regard to weight as well as affecting the air flow. These materials also have other disadvantages. Thus, for example, the use of a silver coating on a metal substrate is sacrificial, in that the resultant silver oxide is readily removed and lost in the air stream. Although nickel is satisfactory it requires a very clean surface for deposition of the metal.

The following U.S. patents are exemplary of the prior art. U.S. Pat. No. 3,269,801, discloses a system for removing ozone from air, employing pellets or particles of non-metallic catalysts such as manganese dioxide located within a canister. In U.S. Pat. No. 2,980,494, it is noted that manganese dioxide when used in powder form to decompose ozone requires catalyst support pellets to prevent packing of the powder. French Pat. No. 1,436,673 discloses that ozone can be removed from air by passing the air through a layer of active granular substance, such as $MnO_2$. However, as previously noted, such filter systems add undesirable weight to an aircraft, and also present considerable resistance to the flow of air therethrough.

U.S. Pat. No. 3,049,399 discloses that air can be deodorized by passing it through a bed of solid materials treated with potassium permanganate; U.S. Pat. Nos. 3,019,197 discloses a silver plated screen coated with a potassium permanganate solution which is dried and used to decompose $H_2O_2$; and U.S. Pat. Nos. 3,421,837 discloses the use of permanganate impregnated alumina for deodorizing air. In these patents, which do not relate to ozone removal, the permanganate is the active material, which is reduced to $MnO_2$ as result of the reaction which takes place.

In the copending application Ser. No. 892,976, filed Apr. 3, 1978, of Norman R. Byrd and Reino E. Luoto, for Ozone Removal Filter, and assigned to the same assignee as the present application, there is disclosed production of a filter for removing ozone from air by depositing a manganese dioxide film on a porous light weight and preferably thermally stable material, such as polybenzimidazole, by treatment thereof with a solution of permanganate, e.g. potassium permanganate.

It is an object of the present invention to provide a process for production of an improved system for removal of ozone from air, particularly in aircraft. A particular object is the provision of a novel procedure for depositing a film or coating of manganese dioxide on a suitable substrate to function as an efficient catalyst, e.g. in the form of a filter, for decomposing and removing ozone from air. A still further object is the provision of a novel ozone removal filter by the above procedure.

SUMMARY OF THE INVENTION

It has been found according to the present invention that the deposition of an oxide coating containing manganese dioxide, ceric oxide and preferably also chromic oxide, of high density and which is highly adherent and which provides an efficient catalyst for removal of ozone from air can be achieved by treatment of the surface of a substrate, such as metal, glass, ceramic or plastic with a permanganate solution, e.g. containing potassium permanganate, and including a soluble ceric salt such as ceric ammonium nitrate, and preferably also including a dichromate, such as sodium dichromate.

It has been found that if certain surfaces or substrates are coated with an oily or hydrocarbon coating, as result of metal processing operations such as mill rolling, for example, such oily coating can be made more susceptible to permanganate oxidation by treatment with such solution. The above permanganate solution is capable of oxidizing such oily or inert hydrocarbon materials to an oxidizable intermediate which more readily lends itself to oxidation by permanganate. The result is the formation on the substrate of a strongly adherent film of $MnO_2$ and ceric oxide, and which preferably also contains chromic oxide where a dichromate is also present in the permanganate solution, and such film of $MnO_2$ and ceric oxide, or $MnO_2$, ceric oxide and chromic oxide, can be used as a catalytic surface to facilitate the rapid decomposition of ozone at ambient temperature, and particularly at elevated temperature. Since the incorporation of a dichromate together with the ceric salt such as ceric ammonium nitrate is preferred for obtaining an $MnO_2$, ceric oxide, chromic oxide coating having the highest efficiency for removal of ozone from air, the invention will be described hereinafter chiefly in terms of the use of the three component permanganate solution and the resulting three component oxides coating.

According to a modification of the invention, since permanganate reacts with various oxidizable substances to produce the oxidation product of such substance and $MnO_2$ as the corresponding reduction product, it is desirable in certain instances to first form a film of a solution of an oxidizable organic component on the substrate, where the substrate surface is otherwise not oxidizable, or does not contain a substance which is oxidizable. Then, onto this film is placed the above solution of the permanganate compound containing ceric ammonium nitrate and preferably also dichromate, and following an appropriate period of contact, the permanganate solution is poured off and the substrate washed with water. At this point, there is deposited a film of $MnO_2$, ceric oxide and chromic oxide on the substrate, which is highly adherent and cannot be rubbed off.

The novel system or device produced by the invention process in the form of a substrate containing the $MnO_2$, ceric oxide, chromic oxide film for removal of ozone from air, can be placed in the air stream, for example the air duct supply system in an aircraft, for efficiently decomposing the ozone in the incoming air. For this purpose, such system can be in the form of a solid substrate such as a metal, e.g. in the form of aluminum mesh screening material or stainless steel wool, to which the manganese dioxide, ceric oxide, and chromic oxide film is applied, such system functioning by passage of air over the surface of such materials. A particularly preferred ozone removal system produced according to the invention process is in the form of a highly thermally stable light weight batting or fabric of an organic or polymeric material, e.g. polybenzimidazole or a chlorinated polyamide, such as the material marketed as Durette, containing the $MnO_2$, ceric oxide, chromic oxide film. These latter substrate materials are also highly porous, as well as being light weight and thermally stable, and the resulting systems can accordingly be employed as a filter, permitting passage of the ozone-containing air through such filter for removal of ozone, with relatively little resistance to air flow. Such ozone removing filters, for example, are much lighter in weight than a carbon or a pelletized catalyst filter, and are very efficient at the supply air temperatures which exist in the low stage bleed air system of an aircraft when ozone is present at high altitudes.

The above substrate materials containing a manganese dioxide, ceric oxide, chromic oxide film produced according to the invention process can be formed into a bag by positioning a plurality of layers of batting or felt, e.g. of polybenzimidazole, within an outer cloth layer of the same material, and the assembly stitched together and impregnated and coated with $MnO_2$, ceric oxide and chromic oxide according to the invention. Such ozone filter conveniently can be formed into a bag, e.g. of conical shape, for placement in the air duct. Alternatively, such $MnO_2$, ceric oxide, chromic oxide coated batting or felt can be formed into filter panels similar to common household furnace filters. The density of these battings and fabrics can be varied by compression to suit desired filtration characteristics, with respect to pressure drop or ozone removal efficiency. These ozone filters, such as polybenzimidazole batting containing a manganese dioxide, ceric oxide, chromic oxide film according to the invention, effectively reduce inlet ozone levels at relatively high inlet air velocity through the filter, and at elevated temperature of the ozone laden air, e.g. 200° to 350° F.

DETAILED DESCRIPTION OF THE PREFERRED EMBODIMENTS

To obtain the film of manganese dioxide, ceric oxide and chromic oxide on a substrate of the above type according to the invention process, a solution of a permanganate in water, and containing a ceric salt such as ceric ammonium nitrate, and preferably also dichromate, is formed, and the substrate is treated or contacted with the solution by any suitable means such as pouring the solution on the substrate or dipping the substrate into the solution. The permanganates which can be used include the permanganates of potassium, sodium, magnesium, calcium and barium, potassium permanganate being preferred. A basic solution of permanganate, e.g. containing sodium carbonate, or an acetone solution of permanganate, also can be used, e.g. a permanganate solution of sodium carbonate. The permanganate solution employed can range from a relatively dilute to a preferably saturated solution with respect to permanganate, the amount of permanganate employed ranging, for example, from about 20 to about 80 grams per liter.

By incorporating into the permanganate solution, preferably a saturated permanganate solution, a soluble ceric salt or mixtures thereof, such as ceric ammonium sulfate, ceric sulfate, or ceric ammonium nitrate, preferably the latter, in an amount, e.g. ranging from about 5 to about 300 grams per liter, it has been found that a more dense and uniform deposit or coating of manganese dioxide, and including ceric oxide, will occur on the surface of the above substrates. Particularly where the above-noted solution also contains a dichromate such as sodium or potassium dichromate, in an amount, e.g. ranging from about 2 to about 200 grams per liter, an even more efficient dense deposit or coating of oxides including manganese dioxide, for use in removal of ozone from air, is obtained. A typical solution of the latter type is a saturated solution of potassium permanganate containing 7 grams of ceric ammonium nitrate and 4 grams sodium dichromate, per liter of solution. Such solutions appear to preoxidize any surface contaminant so that the permanganate can oxidize it further and leave a highly adherent strong oxides film or coating, essentially comprised of manganese dioxide, and also ceric oxide and chromic oxide. The presence of such manganese, ceric and chromic compounds has been determined by x-ray fluorescence spectroscopic analysis.

Treatment with the permanganate solution containing the ceric salt such as ceric ammonium nitrate, and preferably also a dichromate, to apply a film or coating of $MnO_2$, ceric oxide, and preferably also chromic oxide on the substrate can be carried out at from room temperature to elevated temperature up to about 70° C. After remaining in contact with the substrate surface for a period of time, usually about 30 to about 90 minutes, the permanganate solution is removed from the substrate, as by pouring it off, the substrate is washed with water to remove permanganate solution, and the substrate containing the $MnO_2$, ceric oxide, chromic oxide coating is then air dried, e.g. in an oven at about 150° C.

As previously noted, various types of substrates can be treated according to the invention for application of a manganese dioxide, ceric oxide, chromic oxide film thereon, including metals such as aluminum, steel, and titanium among others, and glass, ceramics, and plastics, either as a solid substrate or in the form of fibers, batting or fabric.

Particularly preferred substrates which are treated according to the invention process for application of a manganese dioxide, ceric oxide, chromic oxide film thereon to produce an efficient ozone filter, are highly porous, preferably light weight substrates, and preferably having high thermal stability, e.g. up to about 400° C., particularly organic polymers, in the form of batting, felt or cloth. Especially preferred and effective substrates having the above characteristics are polybenzimidazole (PBI), marketed as batting and cloth, polyamide, particularly chlorinated polyamide such as the material marketed as Durette, in the form of batting or cloth, and polyimide. Another effective substrate of this nature are phenolics such as the material marketed as Kynol, a phenolic fiber which is needle punched on polyester. Polyethylene and cellulose (paper) also can be employed, but are of lower thermal stability.

Porous and preferably thermally stable and light weight inorganic substrates can also be used. These include glass, graphite and boron fibers in the form of batting or fabric, and woven metal fibers such as aluminum mesh and stainless steel wool.

In order to form an adherent film of manganese dioxide, ceric oxide and chromic oxide on the surface of the substrate, preferably the surface of the substrate should be capable of being oxidized by the above permanganate solution or a material should be present on the surface of the substrate which is capable of being oxidized by the above permanganate solution so as to reduce the permanganate to manganese dioxide. Organic materials such as the above noted PBI, Durette, Kynol and polyimide substrates have an oxodizable surface.

However, the production of a manganese dioxide, ceric oxide, chromic oxide film on a substrate, particularly a porous light weight substrate, e.g. polybenzimidazole or polyamide, has been found to be further facilitated by first treating the surface of the substrate with an oxidizable organic solution, that is a solution containing one or more organic components which are oxidizable, prior to treatment with the above permanganate solution containing ceric ammonium nitrate and a dichromate. Organic solutions which can be used for this purpose, are, for example, a dilute solution of ethylene glycol, maleic acid, butyne diol-1,4, abietic acid or glutaraldehyde, in an organic solvent such as n-butanol or toluene. The solution can be relatively dilute, concentration of the organic component of such solution ranging, for example, from about 1 to about 20 grams per liter. Such treatment is carried out at room temperature, but can also be carried out at elevated temperature, e.g. up to about 80° C. After forming a film of the solution of oxidizable material on the substrate surface, the above-noted permanganate solution is applied, the excess permanganate poured off, and the substrate washed and then dried, to leave a thin coating of the brown adherent manganese dioxide, ceric oxide and chromic oxide.

Treatment of the above substrate initially with the organic solution containing an oxidizable substance such as abietic acid prior to treatment with the permanganate solution is optional. However, particularly effective results in the production of a dense, uniform highly adherent film or coating on substrates, such as polybenzimidazole or polyamide, are achieved when employing the above initial treatment of the substrate with an organic solution of an oxidizing agent to form an oxidizable film on the substrate, followed by treatment with a permanganate solution containing ceric ammonium nitrate and a dichromate.

In the case of inorganic substrates such as glass or metals, since oils or hydrocarbons contained on the surfaces of such substrates from handling and processing can be oxidized by permanganate, with reduction of the permanganate to $MnO_2$, it is often unnecessary to pretreat the surfaces of such substances with the above noted organic solution of an oxidizable material.

The invention will be more readily understood from the description below of certain preferred embodiments, taken in connection with the accompanying drawing wherein.

Figures 1, 2, 3, 4:
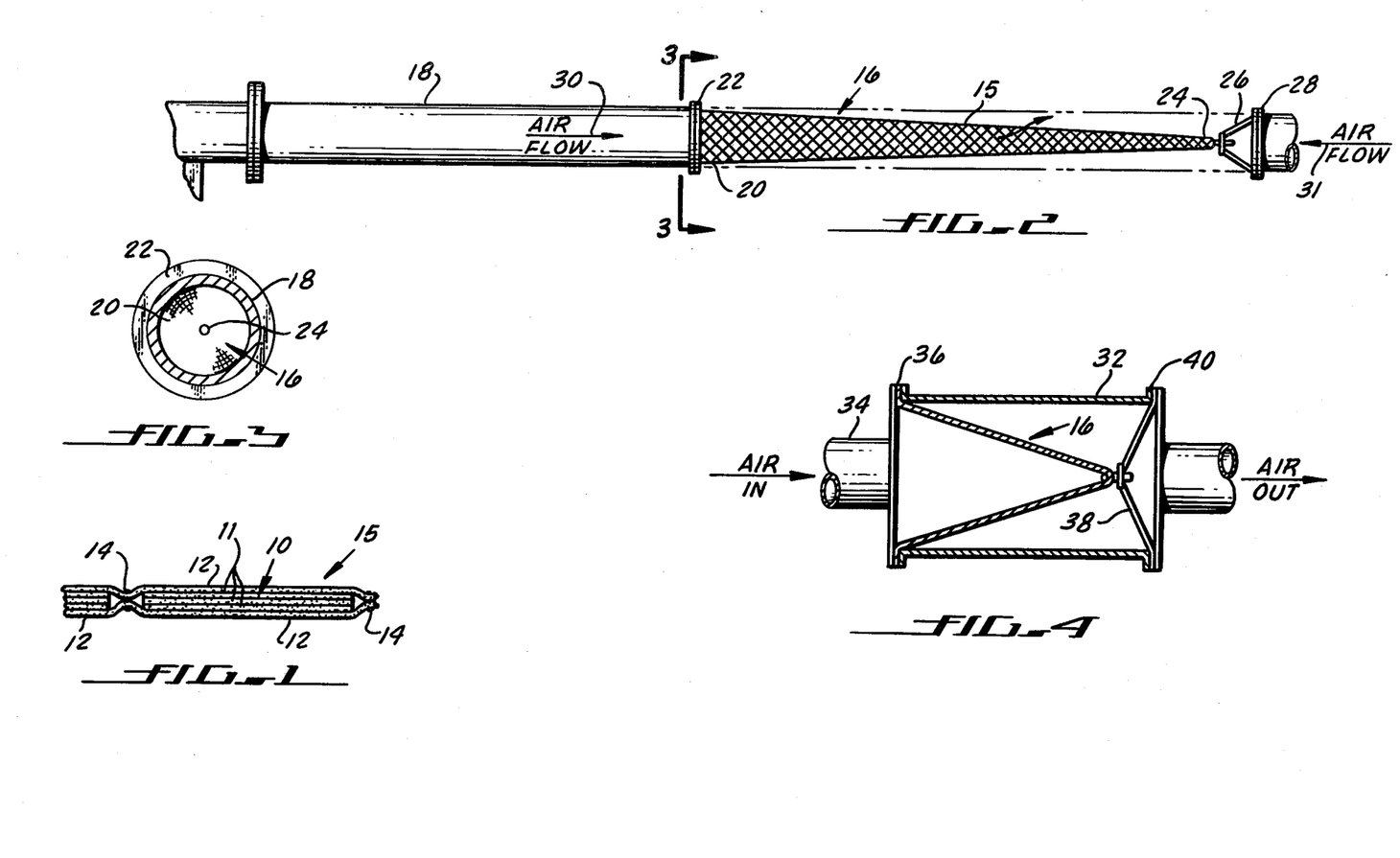
FIG. 1 illustrates production of a filter for removal of ozone according to the invention, formed of polybenzimidazole fabric or felt, positioned between outer layers of cloth of the same material.
FIG. 2 illustrates a system including a filter of the type shown in FIG. 1, in the form of a conical bag coated and impregnated with $MnO_2$, ceric oxide and chromic oxide, positioned in an air duct for treatment of ozone laden air.
FIG. 3 is an end view of the system of FIG. 2, taken on line 3—3 of FIG. 2.
FIG. 4 illustrates a modification of the system shown in FIG. 2, including a separate filter housing.

Referring to FIG. 1, three layers of PBI batting 40-4010-1 at 11 are placed between two outer layers of PBI 40-4010-1 cloth, and the assembly is stitched together as illustrated in FIG. 1. Thus, the assembly 10 of the interior layers of batting 11 and the outer cloth layers 12, are attached together at selected intervals by stitching, as indicated at 14, to form a flexible substrate.

Referring to FIG. 2, the resulting substrate 15 is formed into a conically shaped bag 16, and the bag 16 can be treated by immersion in a solution of potassium permanganate containing ceric ammonium nitrate and sodium dichromate, according to preferred practice of the invention.

The resulting flexible conical bag 16 coated and impregnated with $MnO_2$, ceric oxide and chromic oxide, and of a thickness, e.g. of about 150 inch, is employed as a filter for removal of ozone from air, by mounting it in an air duct 18, the larger end 20 of the bag 16 being held in a flange 22, and the small end 24 being connected to a retention truss 26 connected to a second flange 28, so that the conical filter bag 16 is stretched between flanges 22 and 28 axially in the air duct 18.

Air containing ozone, e.g. at an air flow velocity of about 500 ft/min can be passed through the air duct 18 in the direction indicated by arrow 30, the air passing into the large end of the bag first.

It will be understood that the air flow in the air duct can be in the opposite direction from that shown in FIG. 2, so that the air will then enter the small end of the filter bag 16 first, as indicated by arrow 31.

Referring to FIG. 4, if the air flow velocities in the air duct are large, this can be compensated by increasing the diameter of the filter housing to reduce the velocity through the air filter. Thus, as shown in FIG. 4, there is provided a filter housing 32 of larger diameter than the air duct 34. The conical filter bag 16 can then be mounted with its large end held by a flange 36 at one end of the housing 32, with the small end of the bag supported by a truss 38 connected to a flange 40 at the other end of the filter housing 32, so as to maintained the filter bag 16 stretched in position across the filter housing 32.

The following are examples of practice of the invention.

EXAMPLE I

Five layers of polybenzimidazole batting, marketed as 40-4010-1, by Celanese Fiber Marketing Co., in the form of 6 inch discs and having a total thickness of about ⅛ inch were assembled.

The substrate was then immersed in a saturated solution at room temperature, of potassium permanganate containing ceric ammonium nitrate and sodium dichromate. The solution was prepared by dissolving 270 grams ceric ammonium nitrate and 150 grams sodium dichromate in 1 liter of water. This was then diluted with 3 liters of a saturated solution containing about 80 grams (about 8%) of potassium permanganate in water.

After about 15 minutes in the permanganate solution at room temperature the resulting substrate was removed from the permanganate solution, the permanganate poured off, and the substrate washed with water to remove excess reactants. The substrate or batting was then air dried and placed in a 150° C. over for 1 hour. The batting was then cooled, leaving a manganese dioxide, ceric oxide, chromic oxide coating the film on the batting.

The so-called substrate coated and impregnated with manganese dioxide, ceric oxide and chromic oxide, and of a thickness of about ⅛ inch was tested as a filter for removing ozone from air. The filter was installed in a six inch diameter air line and an ozone generator injected ozone into the air line upstream of the filter. The ozone laden air, containing about 1.2 ppm of ozone was passed through the filter at a velocity of about 300-700 ft/minute, with a pressure drop of about 5-20 inches of water. The ozone concentrations in the air upstream and downstream of the filter were measured by ozone meters for the air feed which was heated to various temperatures.

Figure 5:
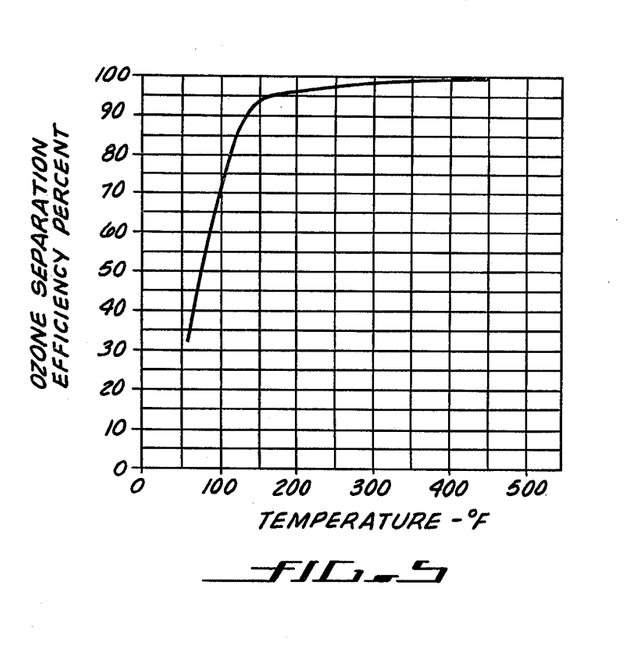
FIG. 5 is a curve illustrating operation of a preferred type of filter produced according to the invention, containing an $MnO_2$, ceric oxide, chromic oxide coating, for removing and decomposing ozone in air at various temperatures.

The test data obtained was plotted, and the resulting curve is shown in FIG. 5. The curve of FIG. 5 shows that the resulting substrate, coated and impregnated with $MnO_2$, ceric oxide and chromic oxide was greater than 90% efficient at air temperatures in excess of about 140° F.

EXAMPLE II

The procedure of Example I for preparing and testing an ozone removal filter was followed, except that the potassium permanganate solution was prepared containing only the ceric ammonium nitrate in the amount noted, and without the use of any dichromate. The resulting substrate thus contained a coating of manganese dioxide and ceric oxide.

Figure 6:
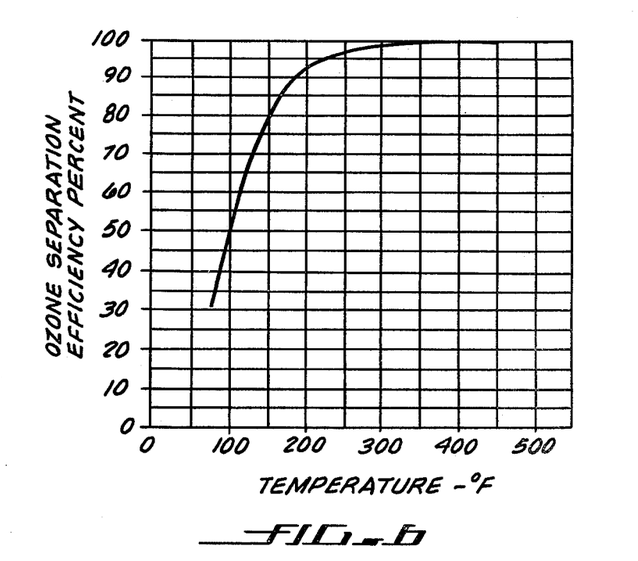
FIG. 6 is a curve for operation of another filter for removal of ozone from air at various temperatures according to the invention.

The data obtained when the coated substrate was tested as a filter for removing ozone from air under the conditions described in Example I was plotted and the resulting curve is shown in FIG. 6. The curve of FIG. 6 shows that such $MnO_2$, ceric oxide coated substrate was greater than 90% efficient at air temperature in excess of about 180° F.

EXAMPLE III

The procedure of Example I for preparing and testing an ozone removal filter was followed, except that the potassium permanganate solution alone, without any addition of ceric ammonium nitrate and dichromate, was used. The resulting substrate thus contained only an $MnO_2$ coating.

Figure 7:
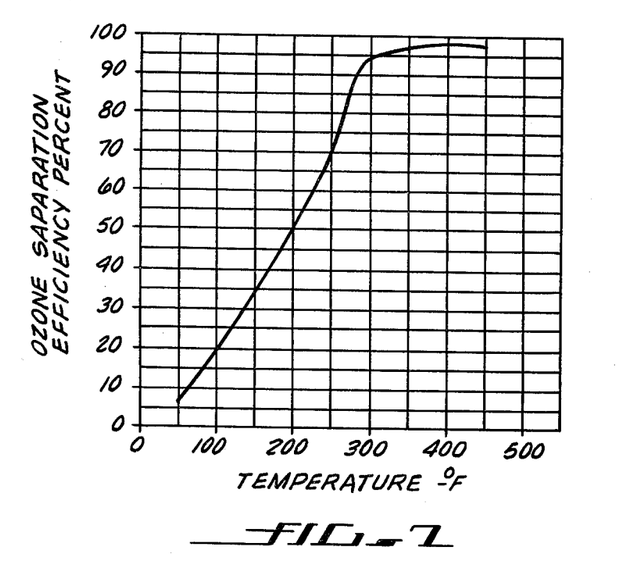
FIG. 7 is a curve illustrating operation of a filter and containing only an $MnO_2$ coating, for removal of ozone from air, at various temperatures.

The data obtained when the coated substrate was tested as a filter for removing ozone from air under the conditions described in Example I was plotted and the resulting curve is shown in FIG. 7. The curve of FIG. 7 shows that such $MnO_2$ coated substrate was greater than 90% efficient at air temperature in excess of about 280° F.

The above examples I to III show that the substrate coated with $MnO_2$ and ceric oxide, as in Example II, was substantially more efficient for removal of ozone from air than the substrate coated with $MnO_2$ alone, as in Example III, and that the substrate coated with $MnO_2$, ceric oxide and chromic oxide, as in Example I, was substantially more efficient in this respect that the substrate coated with $MnO_2$ and ceric oxide, as in Example II.

EXAMPLE IV

The procedure of Example I was followed, except that the potassium permanganate solution was prepared containing only the sodium dichromate and in the absence of any ceric ammonium nitrate.

Figure 8:
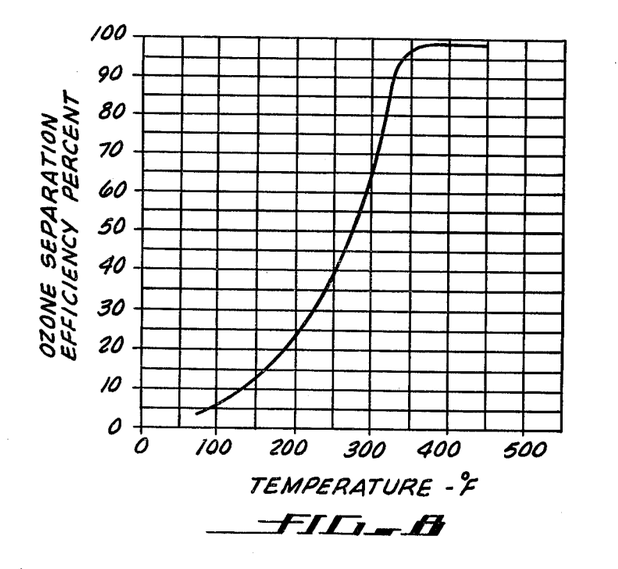
FIG. 8 shows the curve for operation of a filter system containing an $MnO_2$, chromic oxide coating, for removal of ozone in air at various temperatures.

The data obtained when the coated substrate was tested as a filter for removing ozone from air under the conditions of Example I was plotted and the resulting curve is shown in FIG. 8. The curve of FIG. 8 shows that such $MnO_2$, chromic oxide coated substrate was greater than 90% efficient at air temperature in excess of about 330° F.

This example shows that the substrate containing an $MnO_2$, chromic oxide coating was less efficient for removal of ozone from air than the substrate containing only an $MnO_2$ coating of Example III.

EXAMPLE V

One layer of Durette batting, a chlorinated polyamide marketed by Fire Sale Products of St. Louis, Missouri, was placed between two outer layers of Durette (400-11) cloth, and the assembly was stitched together and formed into a conically shaped bag, as illustrated in FIGS. 1 and 2.

The resulting filter bag of a thickness of about ⅛ inch was immersed in a solution of butanol containing 4 grams of abietic acid per liter of n-butanol. When the substrate was saturated with the solution, it was removed and then air dried.

The substrate was then immersed in a saturated solution of potassium permanganate containing ceric ammonium nitrate and sodium dichromate. The solution was prepared by dissolving 2.7 grams ceric ammonium nitrate and 1.5 grams sodium dichromate in 10 ml water. This was then diluted with 390 ml of a saturated solution of potassium permanganate in water. The resulting substrate was removed from the solution and then treated according to the procedure of Example I.

The MnO$_2$, ceric oxide, chromic oxide coated bag was tested as a filter for removing ozone from air by mounting it in an air duct as illustrated in FIG. 2, and air containing ozone in a concentration of 1.2 ppm and at air flow velocity of about 700 ft/min was passed through the air duct.

Figure 9:
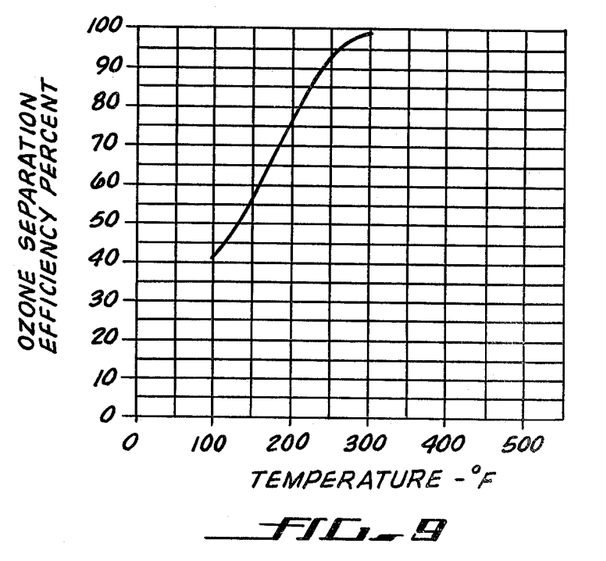
FIG. 9 is a curve for operation of another type of filter for removal of ozone from air at various temperatures according to the invention.

The test data obtained was plotted, and the resulting curve is shown in FIG. 9. The curve of FIG. 9 shows that the Durette filter bag containing the MnO$_2$, ceric oxide, chromic oxide coating had an ozone removal efficiency greater than 90% at air temperature in excess of about 240° F.

EXAMPLE VI

Polybenzimidazole batting without any permanganate treatment was tested as a filter for removing ozone by installing as assembly of 5 layers of such batting in a 6 inch diameter air line and an ozone generator injected ozone into the air line upstream of the filter. The ozone laden air containing about 1.2 ppm of ozone was passed through the filter at an air flow rate approximately the same as the air flow rate in Example I. The air supplied to the filter was heated to various temperatures and the ozone concentrations upstream and downstream of the filter for various air temperatures was measured.

Figure 10:
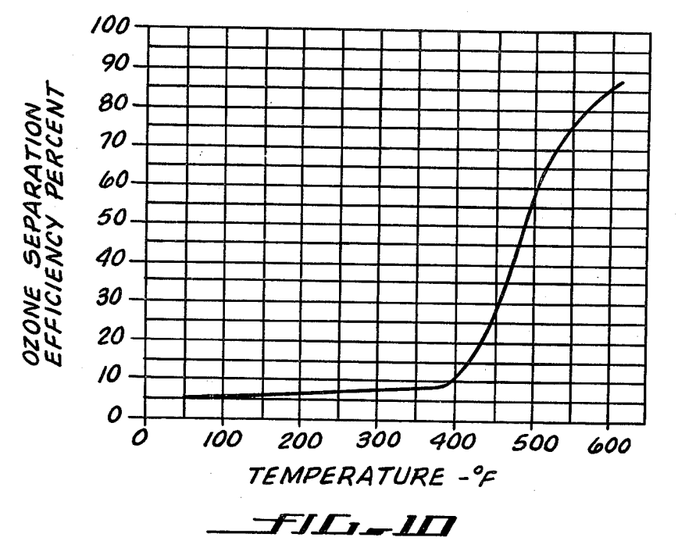
FIG. 10 is a curve illustrating the substantially decreased effectiveness of employing as filter for removal of ozone from air, a substrate similar to that employed in Example 1, but without formation of any oxide coating thereon.

The test data obtained was plotted and the resulting curve of this data in FIG. 10 shows that at air temperatures below 400° F. ozone removal efficiency was less than 10%, and between air temperatures of 400° and 500° F., the ozone removal efficiency of the filter varied between about 10% and about 60%, and at temperatures as high as 600° F., ozone removal efficiency only reached about 85%.

A comparison of the ozone removal efficiency of the PBI filter of this example, containing no manganese dioxide coating, where ozone removal was achieved only by heating the air to very high temperatures, with the ozone removal efficiency of the PBI filter produced according to the invention in Examples I and II, shows the marked effectiveness of the filter produced according to the invention containing an MnO$_2$, ceric oxide and chromic oxide, or MnO$_2$ and ceric oxide coating, for removal of ozone from air at substantially lower air temperatures.

EXAMPLE VII

Four layers of polybenzimidazole batting and four layers of cloth were each immersed in the potassium permanganate-ceric ammonium nitrate-sodium dichromate solution noted in Example V above, at 60° C. for about 10 minutes, washed in water and air dried. The resulting materials containing a coating of MnO$_2$, ceric oxide and chromic oxide were placed in an airstream at various temperatures and at various pressure differentials through the materials, and the concentration of ozone in the air was measured both upstream and downstream from the materials.

The data obtained are set forth in Table I below.

TABLE I

| ΔP inches Hg | PBI Cloth (4 layers) | | |
|---|---|---|---|
| | $C_{us}$ ppm | $C_{ds}$ ppm | t °F. |
| 1.0 | 1.03 | 0.49 | 115 |
| 0.5 | 1.1 | 0.83 | 115 |
| 2.6 | 1.29 | 0.36 | 126 |
| 4.4 | 0.91 | 0.45 | 131 |

TABLE I-continued

| ΔP inches Hg | PBI Batting (4 layers) | | |
|---|---|---|---|
| | $C_{us}$ ppm | $C_{ds}$ ppm | t °F. |
| 2.0 | 0.47 | 0.16 | 118 |
| 1.95 | 1.32 | 0.64 | 120 |
| 0.58 | 0.84 | 0.40 | 117 |

ΔP = pressure drop across filter
$C_{us}$ = concentration of ozone upstream
$C_{ds}$ = concentration of ozone downstream It is accordingly seen from Table I above that the concentration of ozone in the air was substantially reduced following passage of the ozone laden air through the polybenzimidazole materials coated according to the invention.

EXAMPLE VIII

Fiberglass wool or batting is treated substantially according to the procedure of Example VII to form a manganese dioxide, ceric oxide, chromic oxide coating on the substrate.

The resulting batting can be used as described in Example VII as a filter for removing or decomposing ozone in ozone laden air at ambient or elevated air temperatures.

EXAMPLE IX

Stainless steel wool was treated with the abietic acid solution and then with the permanganate solution, as described in Example V above to produce an MnO$_2$, ceric oxide, chromic oxide coating on the substrate.

When used as a filter plug for decomposing ozone in air at room temperature, the following results were obtained:

TABLE II

| ΔP (inches Hg) | $C_{us}$ (ppm) | $C_{ds}$ (ppm) |
|---|---|---|
| 2 | 1.2 | 0.83 |
| 4.4 | 1.7 | 1.64 |
| 0.91 | 1.07 | .07 |

From the foregoing, it is seen that the invention provides an improved process for producing a simple effective device or filter for removal of ozone from air, by treatment of a substrate such as metal, glass, ceramic or plastic, e.g. a thermally stable light weight fire resistant material such as polybenzimidazole, with a potassium permanganate solution containing a ceric salt such as ceric ammonium nitrate, and preferably also containing a dichromate, to form a strongly adherent film of MnO$_2$ and ceric oxide, or MnO$_2$, ceric oxide and chromic oxide, on the substrate. According to a modification of the invention, the substrate is initially treated with an organic solution of an oxidizable material such as abietic acid to further facilitate production of a strong dense oxide film of the types noted above. The ozone filter produced according to the invention can be employed in high temperature environments, and is durable and effective over extended periods of operation.

While particular embodiments of the invention have been described for the purpose of illustration within the spirit of the invention, it will be understood that the invention is not to be taken as limited except by the scope of the appended claims.

What is claimed is:

1. A device effective particularly for removing ozone from air, comprising a substrate containing a coating of manganese dioxide and ceric oxide, deposited from a permanganate solution containing a soluble ceric salt.

2. The device as defined in claim 1, said substrate being selected from the group consisting of metals, glass, ceramics and plastics.

3. The device as defined in claim 1, said coating also containing chromic oxide, said permanganate solution also containing a dichromate.

4. The device as defined in claim 3, said substrate being selected from the group consisting of metals, glass, ceramics and plastics.

5. A filter effective particularly for removing ozone from air, comprising a substrate formed of a porous light weight material containing a coating of manganese dioxide and ceric oxide, deposited from a permanganate solution containing a soluble ceric salt.

6. The filter as defined in claim 5, wherein said substrate is a thermally stable material.

7. The filter as defined in claim 5, said substrate being an organic substrate selected from the group consisting of glass, graphite and boron fibers, and woven metal fibers.

8. The filter as defined in claim 5, wherein said substrate is in the form of batting or cloth.

9. The filter as defined in claim 5, said substrate being comprised of one or more layers of batting of said material positioned between outer layers of cloth of said material, said manganese dioxide and ceric oxide being impregnated into and coated on said batting and said outer cloth layers.

10. The filter as defined in claim 5, said substrate being a member selected from the group consisting of polybenzimidazole, a polyamide, a polyimide, a phenolic, polyethylene and cellulose.

11. The filter as defined in claim 10, wherein said substrate is polybenzimidazole.

12. The filter as defined in claim 10, wherein said substrate is a chlorinated polyamide.

13. The filter as defined in claim 10, wherein said substrate is in the form of phenolic fibers punched on polyester.

14. The filter as defined in claim 5, said coating also containing chromic oxide, said permanganate solution also containing a dichromate.

15. The filter as defined in claim 14, said substrate being an organic polymeric material.

16. The filter as defined in claim 14, said substrate being an inorganic substrate selected from the group consisting of glass, graphite and boron fibers, and woven metal fibers.

17. The filter as defined in claim 14, said substrate being a member selected from the group consisting of polybenzimidazole, a polyamide, a polyimide, a phenol, polyethylene and cellulose.

18. The filter as defined in claim 17, wherein said substrate is polybenzimidazole.

19. The filter as defined in claim 17, wherein said substrate is a chlorinated polyamide.

20. The filter as defined in claim 17, said substrate being comprised of one or more layers of batting of said material stitched between outer layers of cloth of said material, and formed into a bag, said manganese dioxide, ceric oxide and chromic oxide being impregnated into and coated on said batting and said outer cloth layers.

* * * * *

UNITED STATES PATENT OFFICE
CERTIFICATE OF CORRECTION

PATENT NO. : 4,200,609
DATED : 29 April 1980
INVENTOR(S) : Norman R. Byrd

It is certified that error appears in the above-identified patent and that said Letters Patent are hereby corrected as shown below:

Col. 6, line 54 after "about" change 150 to --1/8--

Signed and Sealed this

Fourth Day of November 1980

[SEAL]

Attest:

SIDNEY A. DIAMOND

Attesting Officer

Commissioner of Patents and Trademarks